(12) United States Patent
Furtado et al.

(10) Patent No.: US 12,325,378 B2
(45) Date of Patent: Jun. 10, 2025

(54) AIRBAG TETHER SEPARATION

(71) Applicant: Toyoda Gosei Co., Ltd., Kiyosu (JP)

(72) Inventors: Roland Dominic Furtado, Novi, MI (US); Srinivas Krishnan, Troy, MI (US); Roy Peter Deutschmann, South Lyon, MI (US)

(73) Assignee: Toyoda Gosei Co., Ltd., Kiyosu (JP)

(*) Notice: Subject to any disclaimer, the term of this patent is extended or adjusted under 35 U.S.C. 154(b) by 0 days.

(21) Appl. No.: 18/366,816

(22) Filed: Aug. 8, 2023

(65) Prior Publication Data

US 2025/0050834 A1 Feb. 13, 2025

(51) Int. Cl.
*B60R 21/2338* (2011.01)
*B60R 21/239* (2006.01)

(52) U.S. Cl.
CPC ........ *B60R 21/2338* (2013.01); *B60R 21/239* (2013.01); *B60R 2021/23384* (2013.01); *B60R 2021/2395* (2013.01)

(58) Field of Classification Search
CPC .............. B60R 21/2338; B60R 21/239; B60R 2021/23384; B60R 2021/2395; B60R 2021/23388
See application file for complete search history.

(56) References Cited

U.S. PATENT DOCUMENTS

| | | | | |
|---|---|---|---|---|
| 3,915,043 A | * | 10/1975 | Smith | B26D 5/38 83/639.4 |
| 5,877,563 A | * | 3/1999 | Krappel | H01H 39/006 200/61.08 |
| 6,000,311 A | * | 12/1999 | Katoh | G21C 9/00 83/639.4 |
| 6,454,300 B1 | * | 9/2002 | Dunkle | B60R 21/2338 280/743.2 |
| 6,749,217 B2 | * | 6/2004 | Damian | B60R 21/2338 280/743.2 |
| 6,843,157 B2 | * | 1/2005 | Hamilton | H01H 39/006 83/639.4 |
| 7,275,761 B2 | * | 10/2007 | Gould | B60R 21/2338 280/743.2 |
| 7,364,192 B2 | * | 4/2008 | Braun | B60R 21/233 280/739 |
| 7,498,531 B2 | * | 3/2009 | Knauss | H01H 39/006 200/61.08 |
| 7,690,683 B2 | * | 4/2010 | Parks | B60R 21/239 280/739 |
| 7,832,763 B2 | * | 11/2010 | Stevens | B60R 21/233 83/639.1 |

(Continued)

*Primary Examiner* — Timothy Wilhelm
(74) *Attorney, Agent, or Firm* — Christopher G. Darrow; Darrow Mustafa PC

(57) ABSTRACT

An airbag tether separation system includes an airbag tether separator having an explosive and a housing including a wall with at least one space formed in the wall. The tether separator is structured so that, when the explosive is activated, the explosive produces shockwaves causing separation of a portion of a tether extending between the explosive and the wall. At least a portion of the shockwaves also pass into the at least one space, from where they may pass through the space away from a separation region of the tether and to an exterior of the housing, or be reflected in a direction away from the separation region of the tether.

17 Claims, 12 Drawing Sheets

(56) References Cited

U.S. PATENT DOCUMENTS

| | | | | |
|---|---|---|---|---|
| 7,938,444 B2* | 5/2011 | Williams | ............ | B60R 21/2338 |
| | | | | 280/739 |
| 7,946,618 B2* | 5/2011 | Fukawatase | .......... | B60R 21/239 |
| | | | | 280/739 |
| 8,353,525 B2* | 1/2013 | Parks | .................. | B60R 21/2338 |
| | | | | 280/743.2 |
| 8,388,021 B2* | 3/2013 | Mitsuo | .................. | B60R 21/239 |
| | | | | 280/743.2 |
| 8,500,166 B2* | 8/2013 | Inuzuka | ................ | B60R 21/239 |
| | | | | 280/743.2 |
| 8,727,060 B1* | 5/2014 | Erickson | ................. | B60R 21/00 |
| | | | | 30/367 |
| 9,324,522 B2* | 4/2016 | Nakamura | ........... | H01H 39/006 |
| 10,622,176 B2* | 4/2020 | Volkmann | ............. | B60L 3/0007 |
| 11,007,970 B2* | 5/2021 | Hiraiwa | ............. | B60R 21/203 |
| 11,180,107 B2* | 11/2021 | Peremarty | ............. | B60R 21/017 |
| 11,351,953 B2* | 6/2022 | Deutschmann | ....... | B60R 21/217 |
| 11,865,997 B2* | 1/2024 | Kawamura | ......... | B60R 21/2035 |
| 2005/0057027 A1* | 3/2005 | Fogle, Jr. | ............. | B60R 21/276 |
| | | | | 280/739 |
| 2007/0194561 A1* | 8/2007 | Thomas | .............. | B60R 21/2338 |
| | | | | 280/736 |
| 2009/0301339 A1* | 12/2009 | Ito | ......................... | B60R 21/239 |
| | | | | 102/531 |
| 2013/0056344 A1* | 3/2013 | Borg | ..................... | H01H 39/00 |
| | | | | 200/81 R |

* cited by examiner

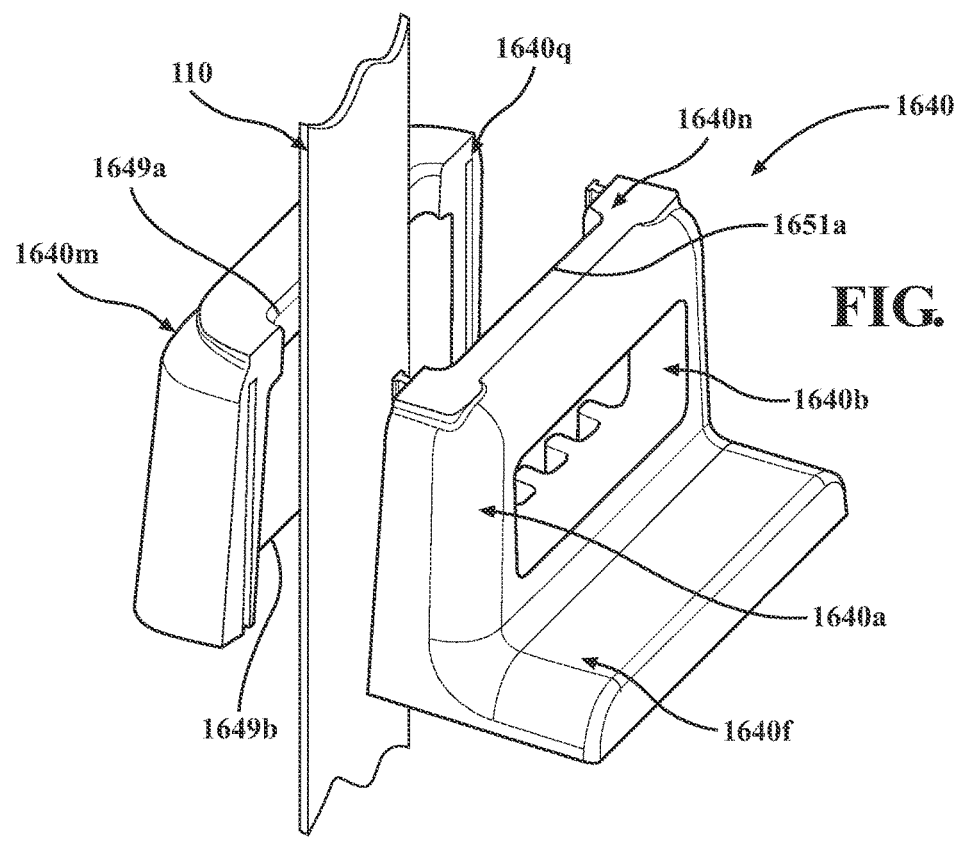
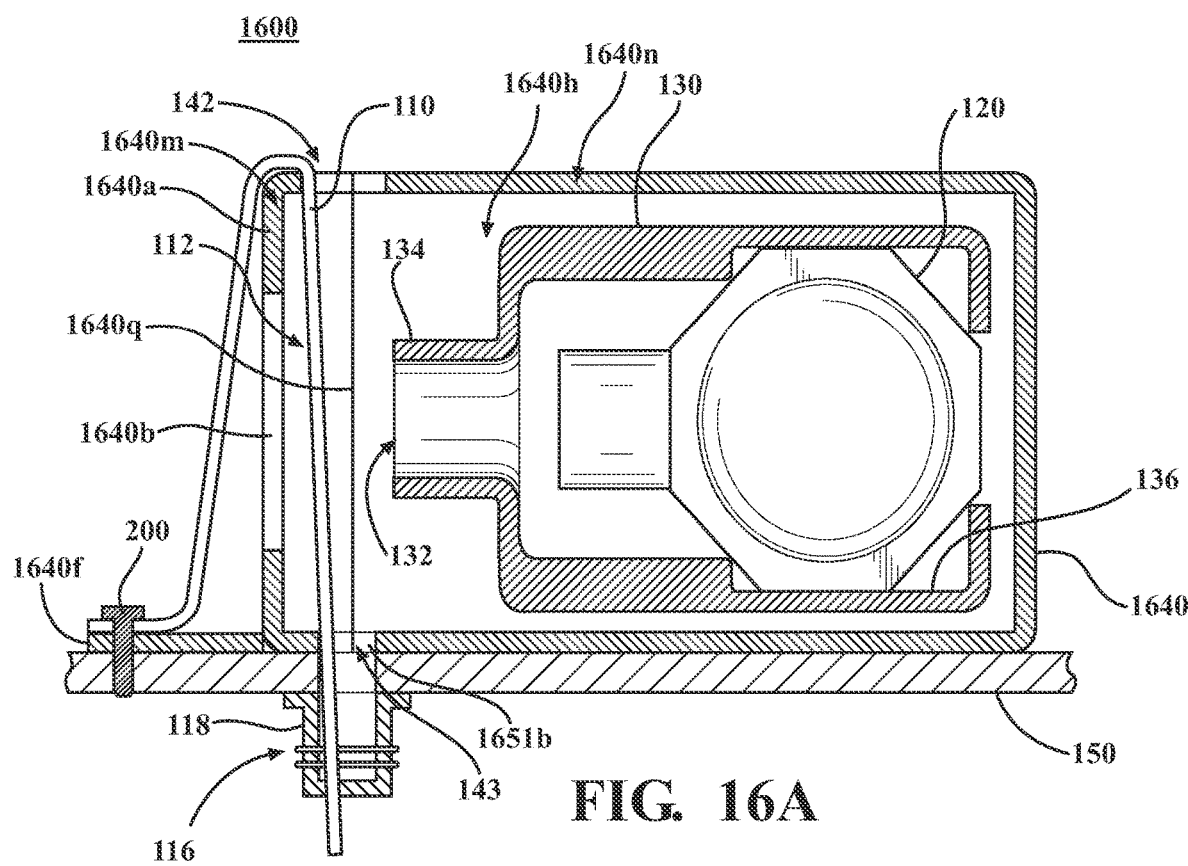

AIRBAG TETHER SEPARATION

FIELD

The subject matter described herein relates in general to airbags and, more particularly, to airbag tethers.

BACKGROUND

Airbags are used in vehicles to protect vehicle occupants. During a crash event, the airbag is configured to rapidly inflate to provide soft cushioning and restraint for a vehicle occupant. The airbag provides an energy-absorbing surface between a vehicle occupant and one or more relatively hard vehicle structures (e.g., a steering wheel, instrument panel, body pillar, headliner, and windshield). An airbag, especially when used in combination with a seatbelt, can reduce the risk of serious injuries and fatalities for vehicle occupants.

SUMMARY

In one respect, the present disclosure is directed to an airbag tether separation system. The system comprises an airbag tether separator including an explosive and a housing having a wall with at least one space formed in the wall. The tether separator is structured so that, when the explosive is activated, the explosive produces shockwaves causing separation of a portion of a tether extending between the explosive and the wall. At least a portion of the shockwaves also pass into the at least one space.

BRIEF DESCRIPTION OF THE DRAWINGS

FIGS. 16 and 16A are views of an embodiment of the airbag tether separation system incorporating a two-piece tether separator housing.

DETAILED DESCRIPTION

Figure 1:
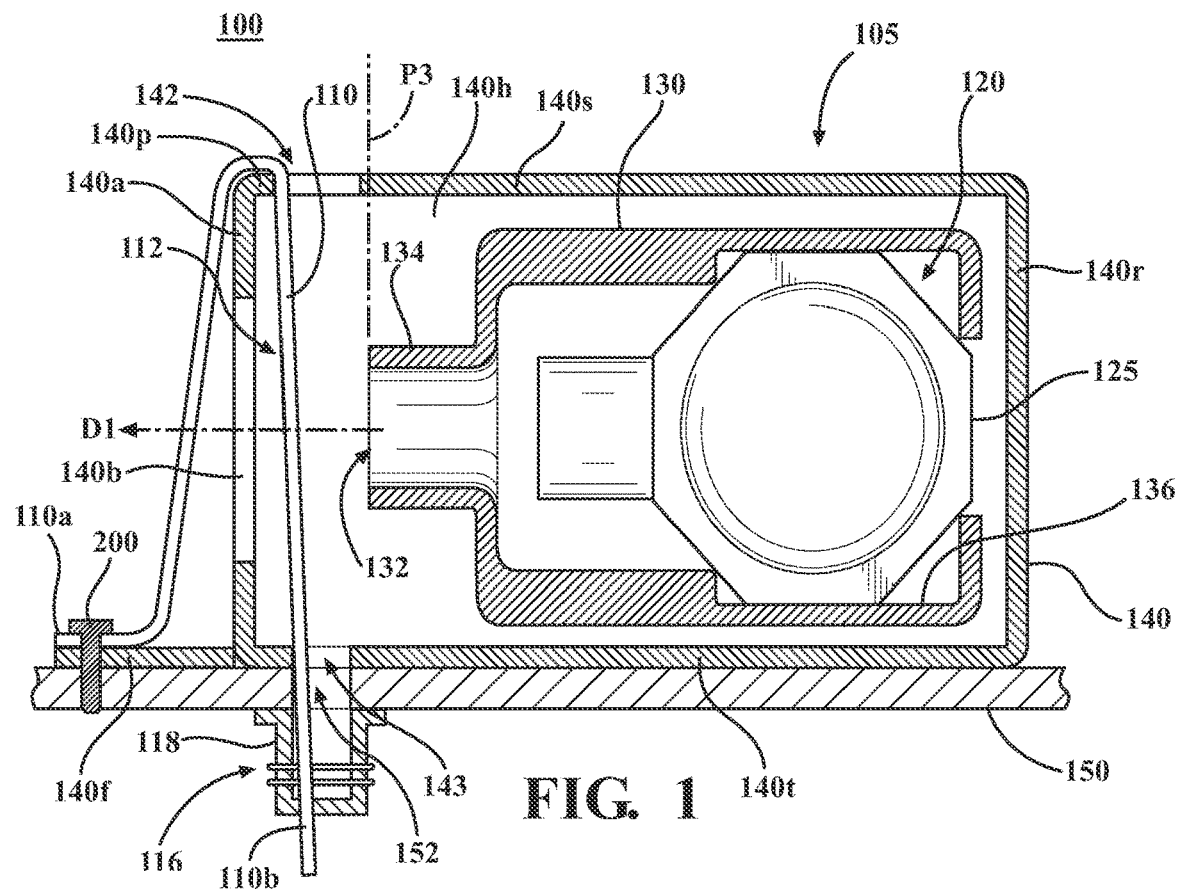
FIG. 1 is a schematic cross-sectional view of one embodiment of an airbag tether separation system including a tether separator incorporating a tether separator housing in accordance with an embodiment described herein.

Some airbags include one or more vents that can relieve pressure inside the airbag. In some instances, these vents can be actively managed vents. Active vents can be used as a tuning feature to manage airbag internal pressure and/or airbag stiffness. A tether can be operatively connected to the actively managed vent. The tether can be released, which, in turn, can cause a vent to be opened or closed depending on the vent configuration. Arrangements described herein can reliably and effectively cause a tether to be released. Arrangements described herein use an explosive. When activated, the explosive can produce shockwaves and/or heat energy. The explosive can be operatively positioned relative to a portion of the tether such that the shockwaves and/or heat energy cause the tether to be separated.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-17, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 2:
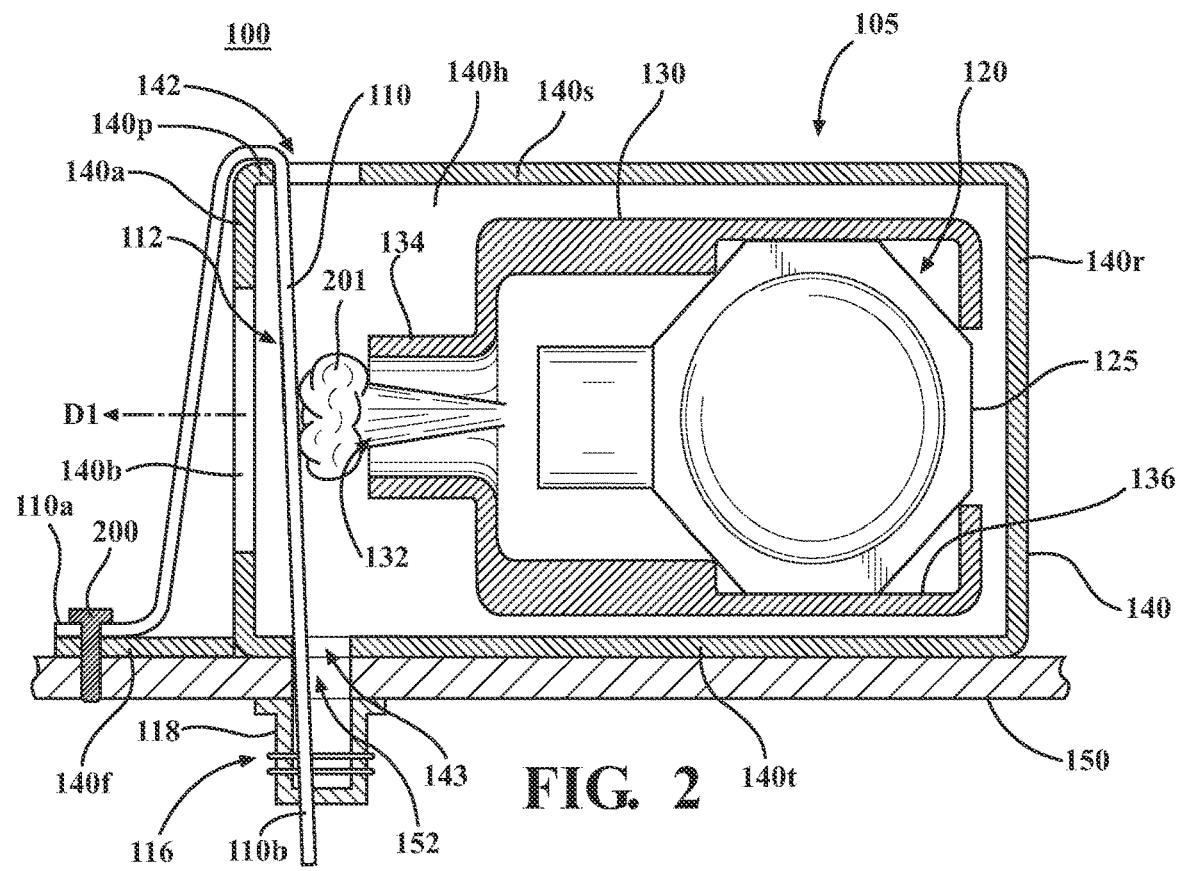
FIG. 2 is the view of FIG. 1, showing the airbag tether separation system in an activated state.
Figure 3:
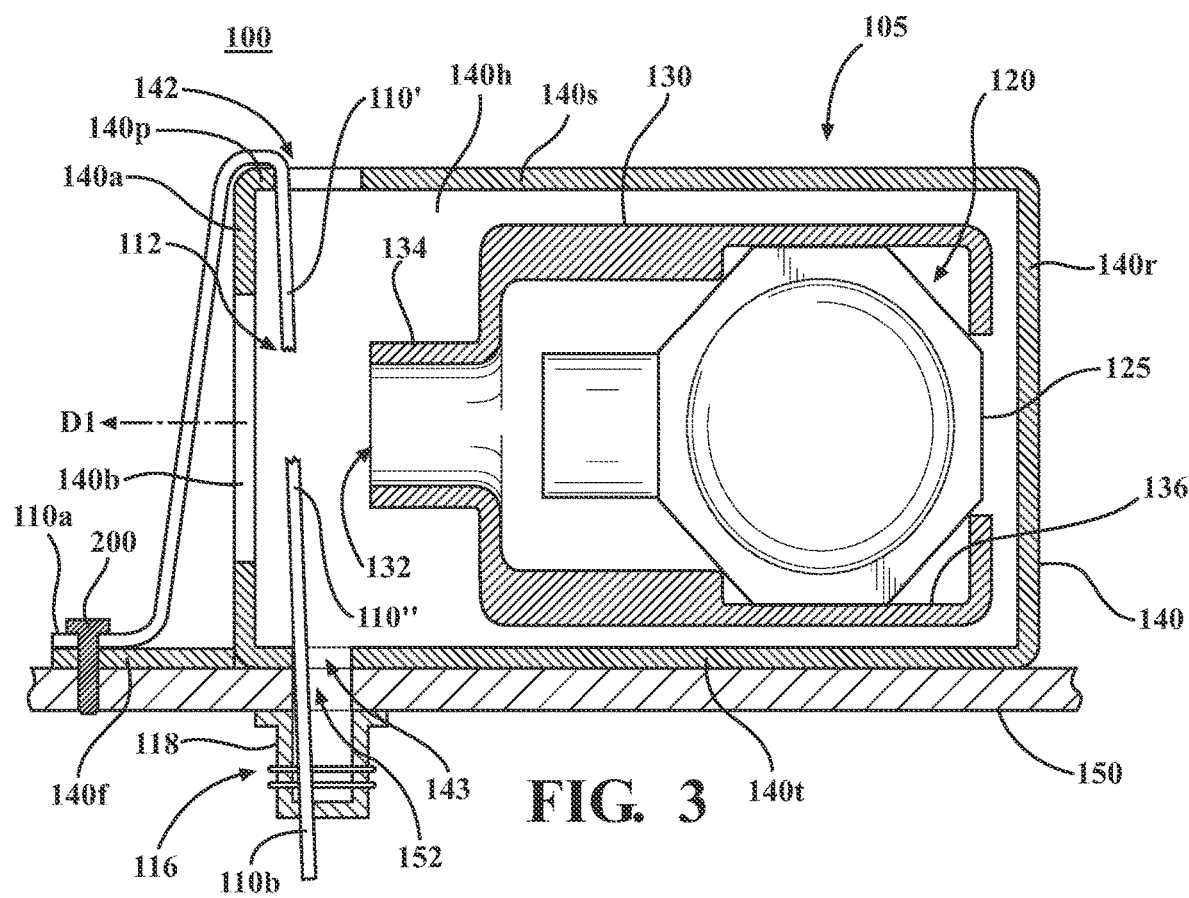
FIG. 3 is the view FIGS. 1 and 2, showing the airbag tether separation system in a post-activated state.

Referring to FIGS. 1-3, an example of an airbag tether separation system 100 is shown. The airbag tether separation system 100 can include a tether separator 105. The tether separator 105 can be configured to cause a tether 110 of an airbag to be separated into two pieces. In some arrangements, the separation of the tether 110 can cause a vent aperture in an airbag cushion (not shown) to open, which can reduce the internal pressure of the airbag cushion. In other arrangements, the separation of the tether 110 can cause the vent aperture in the airbag cushion to close.

The tether separator 105 can include an explosive 120. The explosive 120 can be provided in any suitable form. For instance, the explosive 120 can be an ignitor 125, pyrotechnic device, explosive device, or explosive material, any of which may be currently known or developed in the future. In one or more arrangements, the ignitor 125 can be a 105 mg ignitor or a 230 mg ignitor.

Figure 4:
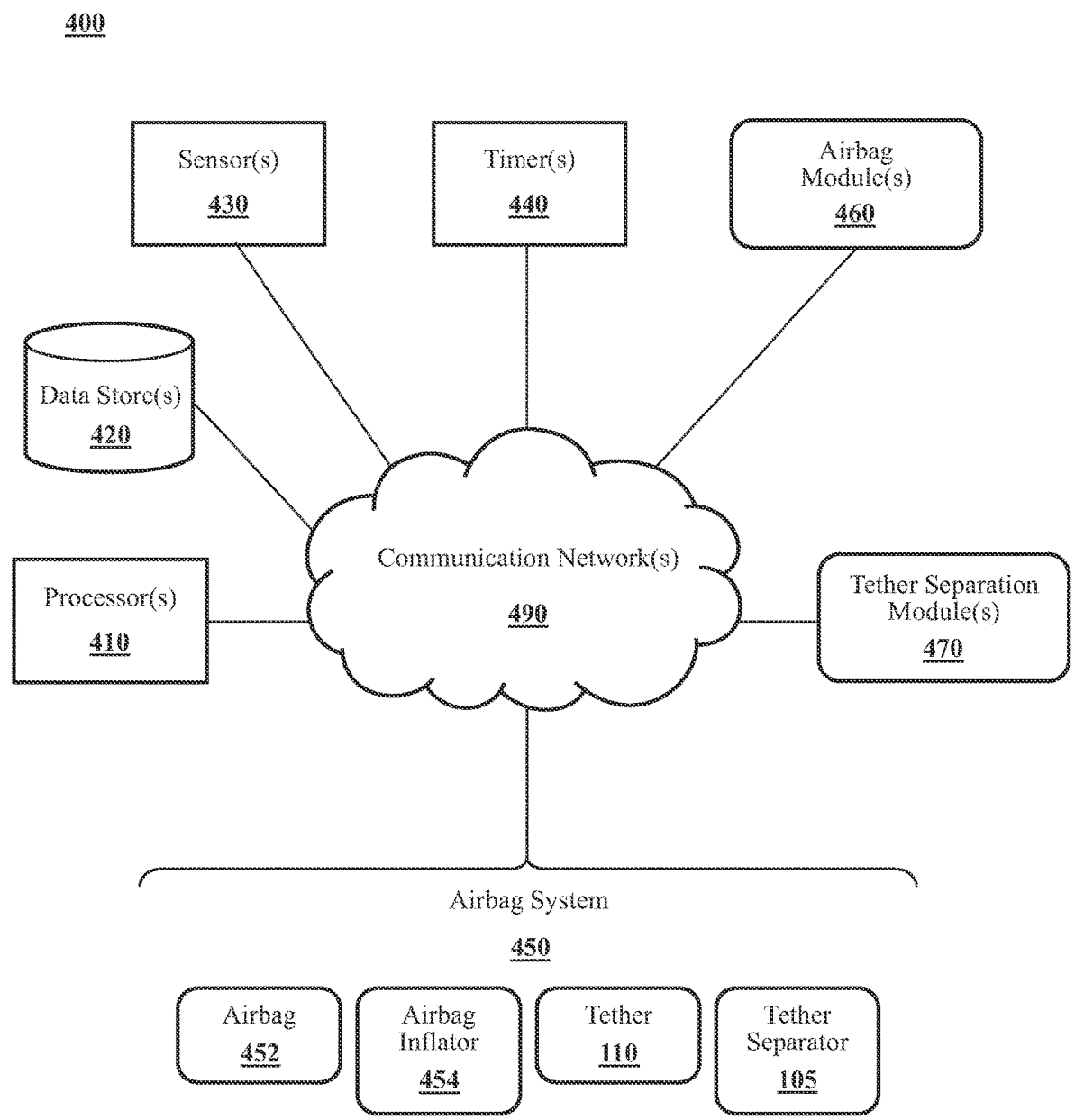
FIG. 4 is an example of an airbag and tether separation system.

The explosive 120 can be operatively connected to one or more processors 410 (FIG. 4). The term "operatively connected," as used throughout this description, can include direct or indirect connections, including connections without direct physical contact. The processor(s) 410 can be configured to activate the explosive 120. When activated, the explosive 120 can produce energy, which can be in the form of shockwaves and/or heat energy. The energy produced by the explosive 120 can be known and within a predetermined range.

In some arrangements, the tether separator 105 can include a focus sleeve 130. The focus sleeve 130 can include an exit opening 132. The focus sleeve 130 can be configured to direct the shockwaves and/or heat energy produced by the explosive 120 to the exit opening 132. In some arrangements, the focus sleeve 130 can have a region of reduced cross-sectional area 134 leading to the exit opening 132. The heat energy produced by the explosive 120 can have an associated temperature.

The focus sleeve 130 and exit opening 132 may be structured to direct shockwaves in a particular desired focus direction D1 (FIG. 1) when exiting the focus sleeve exit opening 132. Referring to FIG. 1, in particular arrangements, the focus direction D1 may be a direction extending perpendicular to a plane P3 of the exit opening 132.

The focus sleeve 130 can be made of any suitable material that can withstand the energy generated by the explosive 120 when activated. The focus sleeve 130 can have any suitable size, shape, and/or configuration. The focus sleeve 130 can be made of a single piece, or it can be made of a plurality of pieces.

The explosive 120 can be at least partially located within the focus sleeve 130. In some arrangements, the focus sleeve 130 can be configured to hold the explosive 120 in place therein. For instance, the focus sleeve 130 can have an inner wall 136. The inner wall 136 can be contoured to engage the explosive 120, such as by frictional engagement. However, it will be appreciated that, alternatively or additionally, the explosive 120 can be held in the focus sleeve 130 in other ways, such as one or more fasteners, one or more adhesives, and/or one or more forms of mechanical engagement.

In some arrangements, the tether separator 105 can include a tether separator housing 140. The housing 140 may define an interior 140h thereof. The focus sleeve 130 and/or the explosive 120 can be at least partially enclosed within the tether separator housing interior 140h. The tether separator housing 140 can be made of any suitable material. The focus sleeve 130 can be operatively connected to the tether separator housing 140 in any suitable manner, including, for example, one or more fasteners, one or more adhesives, and/or one or more forms of mechanical engagement, just to name a few possibilities. The tether separator housing 140 can be made of any suitable material, including, for example, plastic and/or metal.

The tether separator housing 140 can have any suitable size, shape, and/or configuration. In one or more arrangements, the tether separator housing 140 can include slots 142, 143 defined therein. The slots 142, 143 can be substantially aligned with each other. The slots 142, 143 can be sized, shaped, and/or configured to allow at least a portion of the tether 110 to be received therein.

Figure 5:
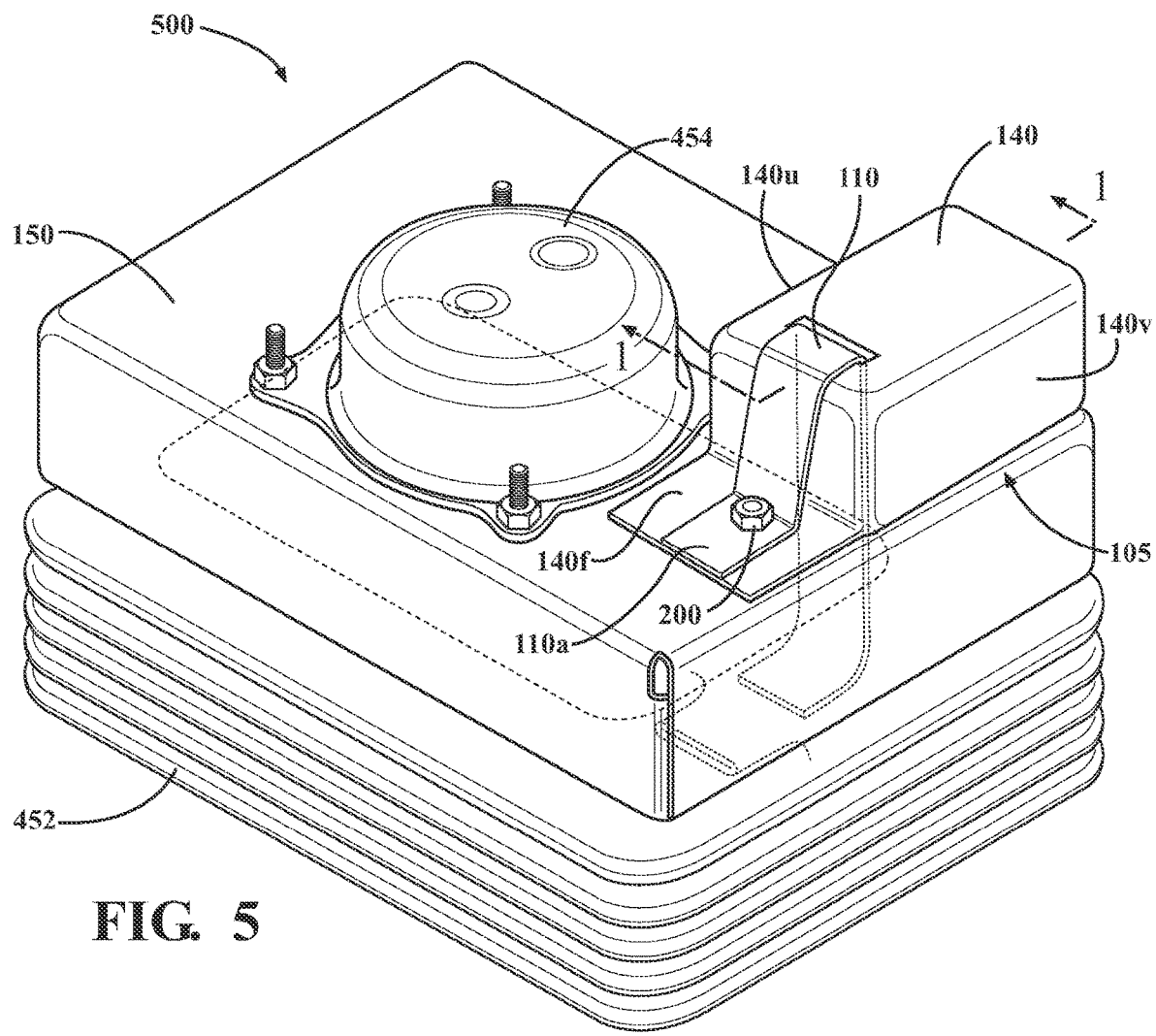
FIG. 5 is a view of a portion of an airbag system including an airbag and a tether separator, showing the airbag cushion and the tether separator in a non-activated state.

Referring to FIGS. 1-3, in one or more arrangements, the housing 140 may include a front wall 140a positioned opposite the focus sleeve exit opening 132, in a position to receive shockwaves and/or heat energy emanating from the exit opening 132. A "front wall" as described herein may be a wall residing directly opposite the focus sleeve exit opening 132, in the focus direction D1 with respect to the exit opening 132. The housing 140 may also have a rear wall 140r, a first pair of opposed sidewalls 140s and 140t, and another pair of opposed sidewalls 140u and 140v (FIG. 5). In combination, walls 140a and walls 140r-140v may define the housing interior 140h.

It has been found that inclusion of a conventional flat wall opposite the focus sleeve exit opening 132 (in the position of front wall 140a) causes a portion of a shockwave or pressure wave emanating from the exit opening to rapidly reflect back toward the opening 132 and into contact with a separation region 112 of the tether 110 (described below) being acted on by shockwaves still emanating from the exit opening 132. This reflection may work against shockwaves still leaving the exit opening 132, thereby reducing the net force acting on the tether 110 to break the tether. It has also been found that the geometry of the front wall 140a facing the focus sleeve exit opening 132 may be modified in any of several ways described herein, to attenuate and/or redirect reflection of shockwaves from the front wall 140a. To this end, in embodiments described herein, the front wall 140a may include at least one space formed therealong and positioned opposite the focus sleeve exit opening 132, along a path of shockwaves emanating from the opening 132. The tether separator 105 may be structured so that, when the explosive 120 is activated, the explosive produces shockwaves causing separation of the tether 110 along the separation region 112 extending between the explosive 120 and the front wall 140a, at least a portion of the shockwaves also passing into the wall space(s). Instead of reflecting the shockwaves straight back toward the separation region 112 of the tether 110 being acted on by shockwaves still emanating from the exit opening 132, the front wall structures described herein may cause the portion of the shockwaves entering the wall space(s) to either propagate outside the housing 140 or reflect in directions away from the separation region 112 of the tether 110. This has been found to help attenuate the counter-pressure acting on the separation region of the tether 110, thereby increasing the net breaking force acting on the tether and the reliability of the tether separation system.

In the embodiment shown in FIGS. 1-3, the space provided in housing front wall 140a is in the form of a through-hole 140b formed in the wall. The space 140b may permit shockwaves emanating from exit opening 132 and impinging on the tether 110 to continue to propagate in direction D1, outside the housing 140, so that they do not reflect back toward the separation region 112 and interfere with tether separation.

In some arrangements, the tether separator housing 140 can be operatively connected to an airbag housing 150. The airbag housing 150 can be a driver airbag housing or a passenger airbag housing. The tether separator housing 140 can be operatively connected to the airbag housing 150 in any suitable manner, including, for example, one or more fasteners, one or more adhesives, and/or one or more forms of mechanical engagement, just to name a few possibilities.

In the embodiment shown in FIGS. 1-3, the tether separator housing 140 is at least partially attachable to the airbag housing 150 through a flange 140f extending from the tether separator housing 140. The flange 140f may be formed integrally with the housing 140, or the flange may be formed separately and attached to the housing using any suitable method, such as welding or adhesives. In one or more arrangements, the tether separator housing 140 may be attached to the airbag housing 150 through one or more bolts 200 applied through the flange 140f.

A slot 152 can be defined in the airbag housing 150. The slot 152 can be sized, shaped, and/or configured to allow passage of at least a portion of the tether 110. The slot 152 in the airbag housing 150 can be substantially aligned with the slots 142, 143 in the tether separator housing 140.

Turning to the tether 110, a first end 110*a* of the tether 110 can be anchored to any suitable structure at or near the tether separator 105, and a second end 110*b* of the tether 110 can be operatively connected to a closure member (not shown), which can be used to selectively cover and uncover a vent hole in an airbag cushion. The tether 110 can have any suitable configuration, now known or later developed. In one or more arrangements, the tether 110 can be a strap-like or belt-like structure. The tether 110 can have any suitable dimensions. The tether 110 can be made of any suitable material. In one or more arrangements, the tether 110 can be made of a fabric material. As an example, the tether 110 can be made of nylon 66 (PA66) or polyethylene terephthalate (PET). The tether 110 can be made of a single layer of material, or it can be made of a plurality of layers.

The material of the tether 110 can have various associated properties. For example, the material of the tether 110 can have an associated melting point. The melting point of the material can be less than the temperature of the heat energy produced by the explosive 120. As another example, the material of the tether 110 can have an associated tensile strength. The tensile strength of the material can be sufficient to withstand the expected airbag deployment forces acting on the tether 110.

The tether 110 can include a separation region 112. The separation region 112 can be a region of the tether 110 where the tether 110 is intended to be separated during airbag deployment. It will be appreciated that the term "separated" and variants thereof includes any manner of separation of the tether 110 into two separate pieces. Non-limiting examples of separating can include disintegrating, tearing, cutting, ripping, shearing, severing, shredding, slicing, splitting, disconnecting, breaking, cleaving, burning, melting, and any combination thereof.

The separation region 112 of the tether 110 can be operatively positioned relative to the explosive 120. For instance, the separation region 112 can be positioned such that the energy produced by the explosive 120, when activated, separates the tether 110. In some arrangements, the separation region 112 can be spaced from the explosive 120 within a predetermined distance.

Alternatively or additionally, the separation region 112 of the tether 110 can be operatively positioned relative to the exit opening 132 of the focus sleeve 130. For instance, the separation region 112 can be spaced from the exit opening 132 and positioned opposite the exit opening 132 such that the energy produced by the explosive 120, when passing out of the exit opening 132, impinges on the separation region 112 to separate the tether 110. In some arrangements, the separation region 112 can be spaced from the exit opening 132 within a predetermined distance.

In one or more arrangements, a portion of the tether 110, including at least the separation region 112, can be located within the tether separator housing interior 140*h*. To that end, a portion of the tether 110 can pass through the aligned slots 142, 143 of the tether separator housing 140 and a slot 152 in the airbag housing 150.

In one or more arrangements, as previously described, the tether separator housing 140 may include a slot 142. In addition, as shown in FIGS. 1-3, a portion of the tether 110 (including separation region 112) may extend through the housing interior 140*h* between the explosive 120 and the housing front wall 140*a* and out of the housing interior 140*h* through the slot 142 to an exterior of the housing 140. The tether 110 may be secured at a securement location along the housing exterior. In one or more particular arrangements, the tether 110 may wrap over a portion 140*p* of the housing 140 positioned between the slot 142 and a portion (e.g., flange 140*f*) of the housing exterior to which the first end 110*a* of tether 110 is secured. In particular arrangements, the tether first end 110*a* may be secured to the flange 140*f* using the bolts 200 securing the flange 140*f* to the airbag housing 150.

In some arrangements, a portion of the tether 110, including at least the separation region 112, can be held in tension. In some arrangements, the separation region 112 can be defined by the portion of the tether 110 that is held in tension or a portion thereof. The tensioning of the tether 110 can be achieved in various ways. For instance, the tether 110 can be held in tension between a first anchor area where the tether first end 110*a* is attached to the flange 140*f*, and a second anchor area 116. Any suitable degree of tension can be provided. It will be appreciated that, by providing the portion of the tether 110 in tension, the separation region 112 of the tether 110 can be maintained within a distance from the exit opening 132 of the focus sleeve 130 or otherwise maintained at a distance from the explosive 120. If the portion of the tether 110 was slack or otherwise not in tension, then the tether 110 could potentially bow or otherwise move in a direction away from the explosive 120 or the exit opening 132. Consequently, the shockwaves and/or heat energy produced by the explosive 120 may have a reduced effect on the tether 110, possibly being insufficient to separate the tether 110.

In one or more arrangements, the second anchor area 116 can be generally located on an opposite side of the tether separator housing 140 from the first anchor area 110*a*. In the second anchor area 116, the tether 110 can be fixed to the airbag housing 150 or some other structure, such as by one or more fasteners, one or more adhesives, and/or one or more forms of mechanical engagement. Alternatively or additionally, the tether 110 can be knotted or sewn upon itself and/or to some other structure at the second anchor area 116. In some arrangements, a connector 118 can be used to fix the tether 110 at the second anchor area 116. In some arrangements, the connector 118 can close and/or substantially close the slot 152 defined in the airbag housing 150.

FIG. 1 shows the tether separator 105 in a non-activated state. The separation region 112 of the tether 110 can be held in tension. FIG. 2 shows the tether separator 105 in an activated state. The explosive 120 is activated. As a result, the explosive 120 can produce energy 201, primarily in the form of shockwaves and/or heat. The focus sleeve 130 can direct the shockwaves and/or the heat energy to the separation region 112 of the tether 110. The shockwaves and/or the heat energy can cause the tether 110 to be separated into two pieces (the first tether piece 110' and the second tether piece 110"). FIG. 3 shows the tether separator 105 in a post-activated state. The second tether piece 110" is released, which, in turn, can cause an active vent to open or close.

The tether separator 105 can be part of an airbag tether separator system. FIG. 4 shows an example of an airbag tether separator system 400. Some of the possible elements of the airbag tether separator system 400 are shown in FIG. 4 and will now be described. It will be understood that it is not necessary for the airbag tether separator system 400 to have all of the elements shown in FIG. 4 or described herein. The airbag tether separator system 400 can include a one or more processors 410, one or more data stores 420, one or more sensors 430, one or more timers 440, one or more airbag systems 450, one or more airbag modules 460, and/or one or more tether separation modules 470. The various elements of the airbag tether separator system 400 can be operatively connected and/or communicatively coupled to each other in any suitable manner and in any suitable combination.

The airbag tether separator system 400 can include an airbag system 450. The airbag system 450 can include various components related to airbags. For instance, the airbag system 450 can include an airbag cushion 452, an inflator 454, the tether 110, and a tether separator 105. These can be any of these types of components, now known or later developed. The tether separator 105 and the tether 110 can be as described in connection with FIGS. 1 and 2.

The airbag tether separator system 400 can include one or more modules. The modules can be implemented as computer readable program code that, when executed by a processor, implement one or more of the various processes described herein. One or more of the modules can be a component of the processor(s) 410, or one or more of the modules can be executed on and/or distributed among other processing systems to which the processor(s) 410 is operatively connected. The modules can include instructions (e.g., program logic) executable by one or more processor(s) 410. Alternatively or in addition, one or more data stores 420 may contain such instructions. The modules described herein can include artificial or computational intelligence elements, e.g., neural network, fuzzy logic or other machine learning algorithms. Further, the modules can be distributed among a plurality of modules.

The airbag tether separator system 400 can include one or more airbag modules 460. The airbag module(s) 460 can be any module, now known or later developed, configured to control the deployment of the airbag. The airbag module(s) 460 can send control signals to cause the airbag to be inflated. The airbag module(s) 460 can analyze data from the sensor(s) 430 to determine when to activate the airbag.

The airbag tether separator system 400 can include one or more tether separation modules 470. The tether separation module(s) 470 can be configured to control the separation of the tether. The tether separation module(s) 470 can be configured to send control signals to the tether separator 105 to cause the explosive 120 to be activated. The tether separation module(s) 470 can activate the explosive based on data from the sensor(s) 430, the timer(s) 440, and/or responsive to an input or command from any source.

A non-limiting example of the operation of the arrangements described herein will now be presented in connection to FIGS. 5-10. FIG. 5 shows a view of a portion of an airbag system 500. The airbag system can include an airbag cushion 452, an inflator 454, a tether 110, a tether separator 105, and an airbag housing 150. Of course, it will be recognized that the airbag system 500 can include additional or alternative components to those shown. The airbag cushion 452 and the tether separator 105 are in a non-activated state. It should be noted that FIG. 5 corresponds to the condition of the tether separator 105 shown in FIG. 1.

Figure 6:
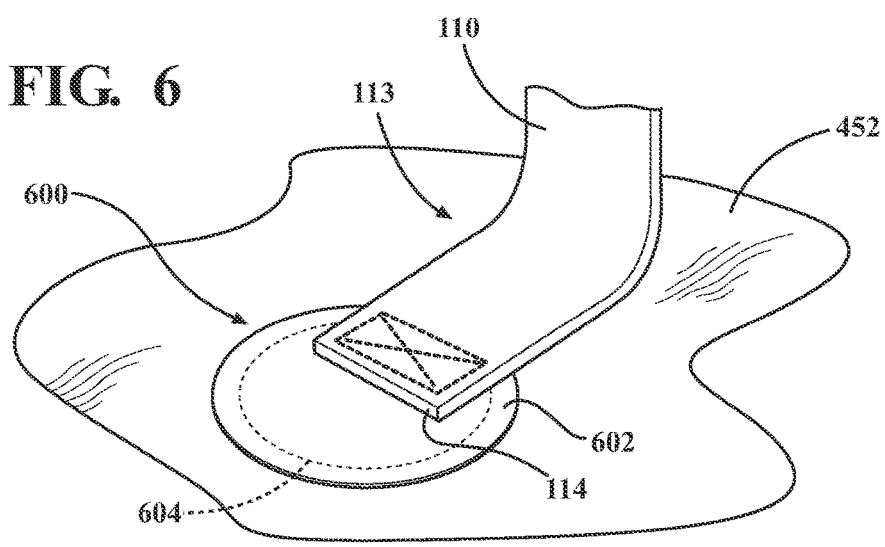
FIG. 6 is a view of a portion of the interior of the airbag, showing a tether operatively connected to an active vent.

The tether first end 110a can be fixed to the housing 140 along flange 140f as previously described. Referring to FIG. 6, the second end 110b of the tether 110 can be operatively connected to an active vent 600 of the airbag cushion 452 in any suitable manner. In this example, the active vent 600 includes a closure member 602 that closes a vent opening 604. In some instances, the closure member 602 can be attached to the airbag cushion 452 so as to substantially seal the vent opening 604. However, it will be appreciated that other manners of closing the vent opening 604 are possible. The closure member 602 can be a piece of fabric. In some arrangements, the closure member 602 can be the same material as the airbag cushion 452 or the tether 110.

Figure 7:
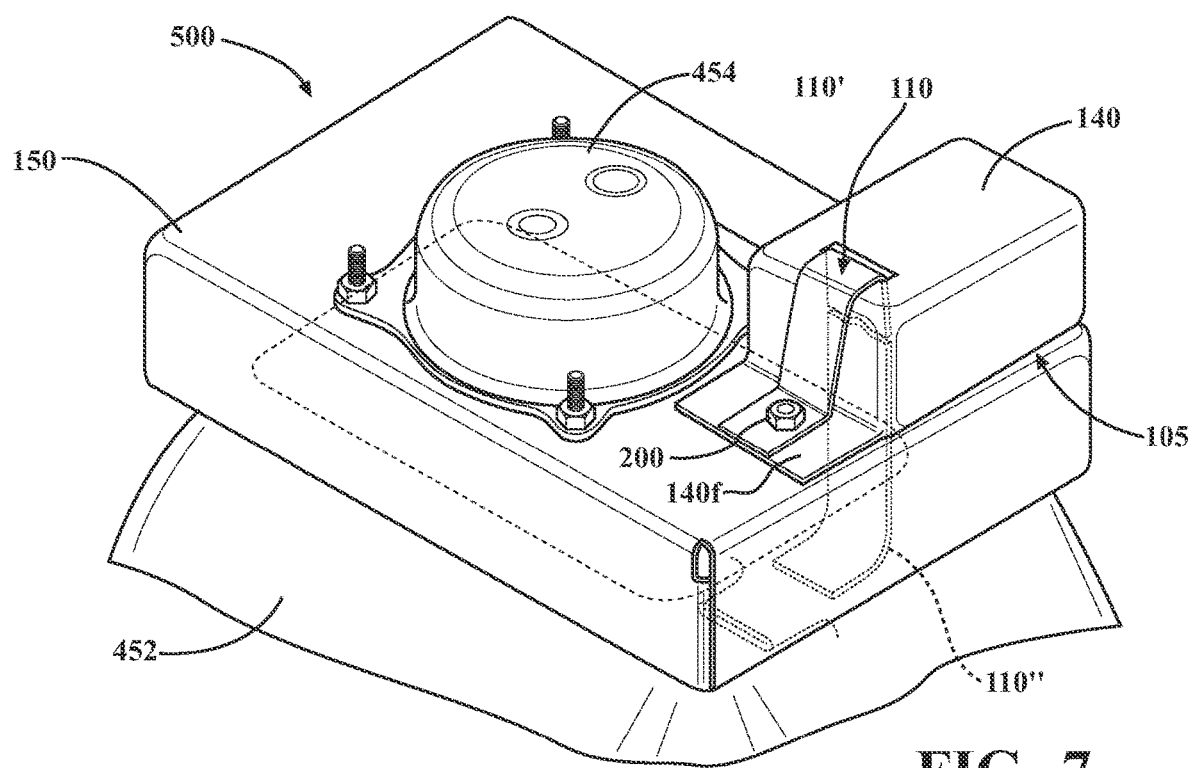
FIG. 7 is a view of the portion of the airbag system, showing the airbag cushion being deployed and the tether separator in an activated state.

When an airbag deployment condition is detected, the airbag cushion 452 can be activated. The inflator 454 can be activated to inject gas into the airbag cushion 452, causing it to rapidly expand. The inflator 454 can be any type of inflator, now known or later developed. FIG. 7 shows the airbag cushion 452 as being deployed. FIG. 7 corresponds to the condition of the tether separator 105 shown in FIG. 2. The tether separator 105 can be activated to cause the explosive 120 to be activated. The tether separator 105 can be activated at any time and/or based on any predetermined condition or criteria. For instance, the tether separator 105 can be activated at a predetermined time after the airbag cushion 452 has deployed. As another example, the tether separator 105 can be activated when an internal pressure of the airbag is reached.

Figure 8:
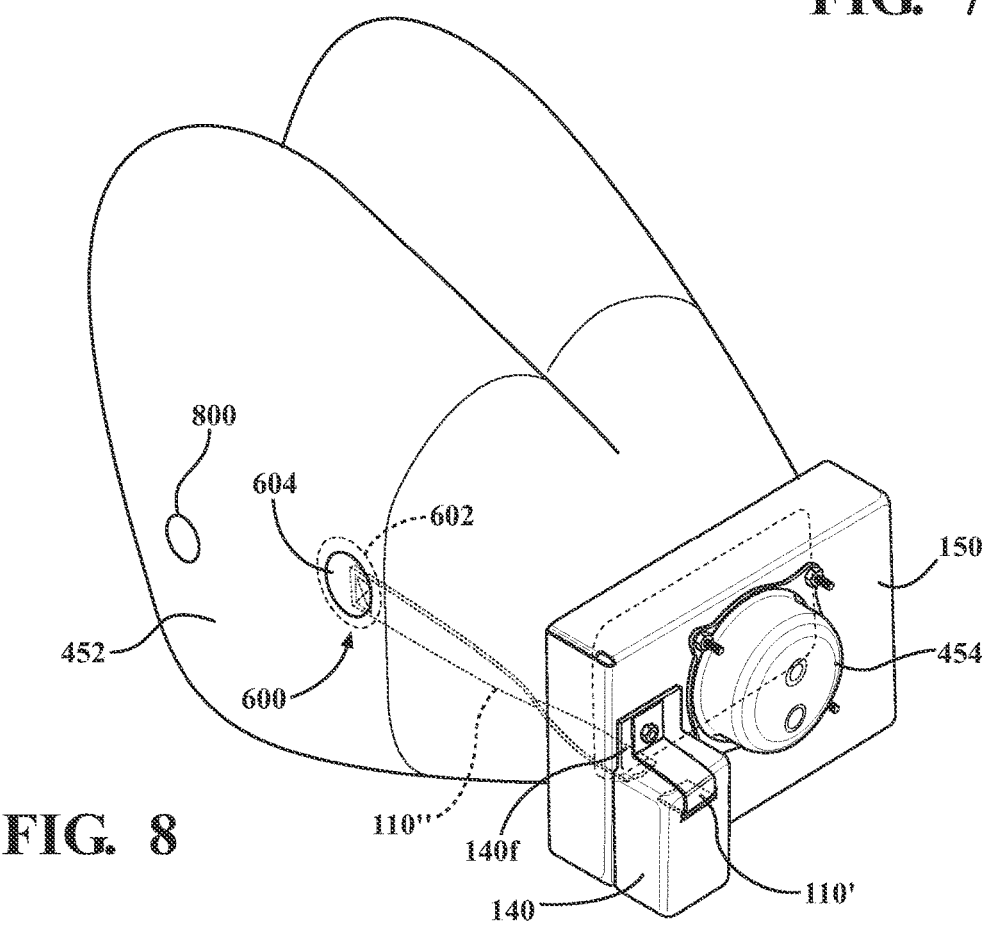
FIG. 8 is a view of the deployed airbag, showing the active vent in a closed condition.

The shockwaves and/or the heat energy produced by the explosive 120 can cause the tether 110 to be separated in the separation region 112 into two separate pieces. Thus, at this point, there is a first tether piece 110' and a second tether piece 110". The first tether piece 110' can remain attached to flange 140f at tether first end 110a. The second tether piece 110" can be free to move within the airbag cushion 452. At this moment, the active vent 600 is still closed, as is shown in FIG. 8. It should be noted that the airbag cushion 452 can include additional vents for relieving internal pressure of the airbag cushion 452. For instance, the airbag cushion 452 can include additional active vents. Alternatively or additionally, the airbag cushion 452 can include one or more discrete vents 800, which are vent openings in the airbag cushion 452 that in an open condition.

Figure 9:
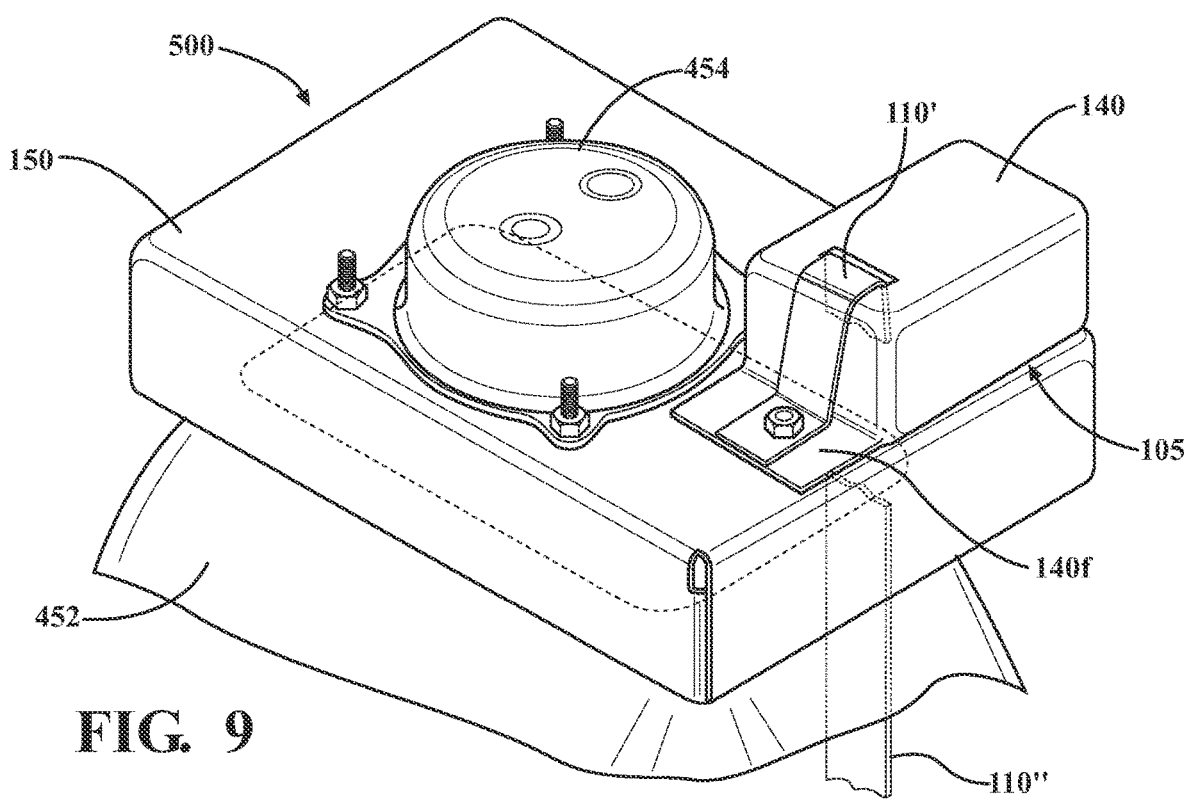
FIG. 9 is a view of the portion of the airbag system, showing the airbag cushion being deployed and the tether being separated.
Figure 10:
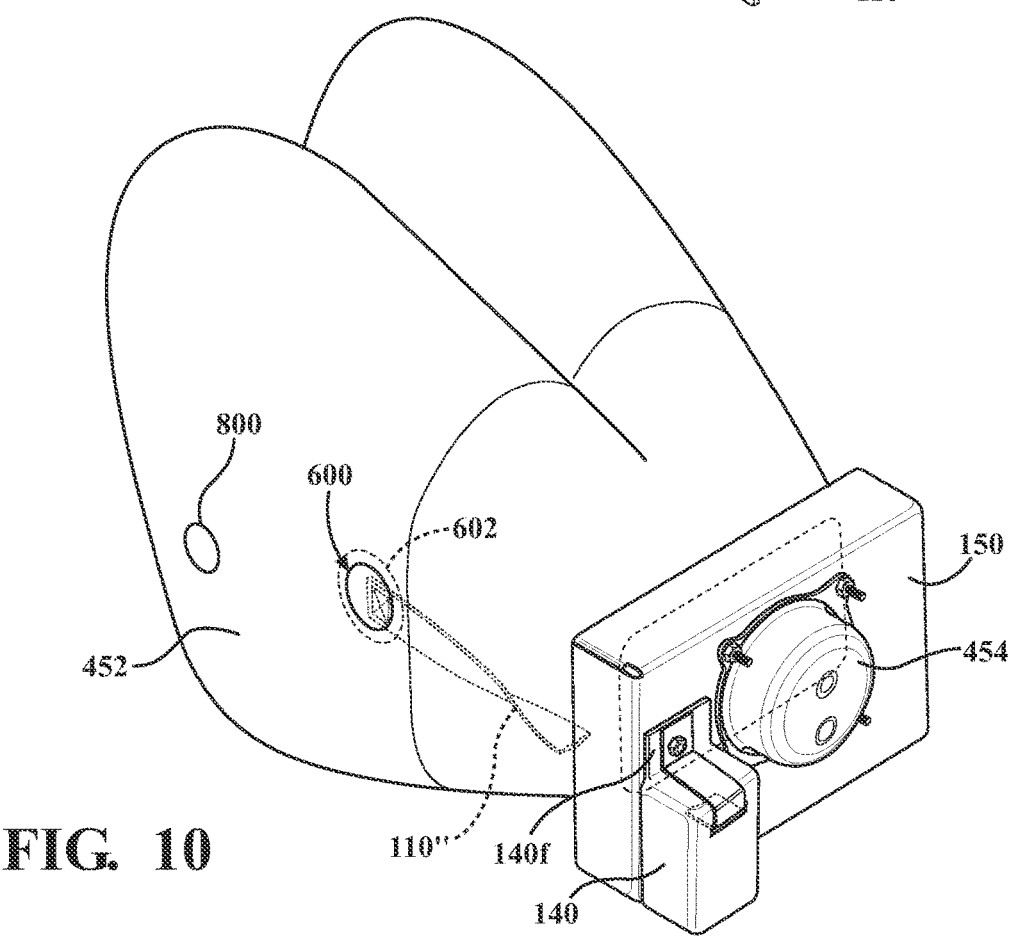
FIG. 10 is a view of the deployed airbag, showing the active vent in an open condition.

FIG. 9 shows a post-activated state of the tether separator 105. The second tether piece 110" can move within the interior of the airbag cushion 452. FIG. 9 corresponds to the condition of the tether separator 105 shown in FIG. 3. The separation of the tether 110 can cause the active vent 600 to be opened, as is shown in FIG. 10. The separation of the tether 110 can allow the closure member 602 to lift off of the vent opening 604. With the active vent 600 being open, pressure within the airbag cushion 452 can be relieved.

In the arrangements described above, the tether 110 is used in connection with one example of an active vent of the airbag cushion 452 in which the separation of the tether 110 causes the active vent to open. However, it should be noted that there are various active vent configurations. In some arrangements, the separation of the tether 110 can cause the active vent to close. It will be understood that arrangements described herein can be used in connection with any active vent system, now known or later developed, that makes use of the separation of a tether 110. Further, it will be appreciated that the tether separator arrangements described herein can be used to separate tethers that are not used in connected with an active vent.

Figure 11A:
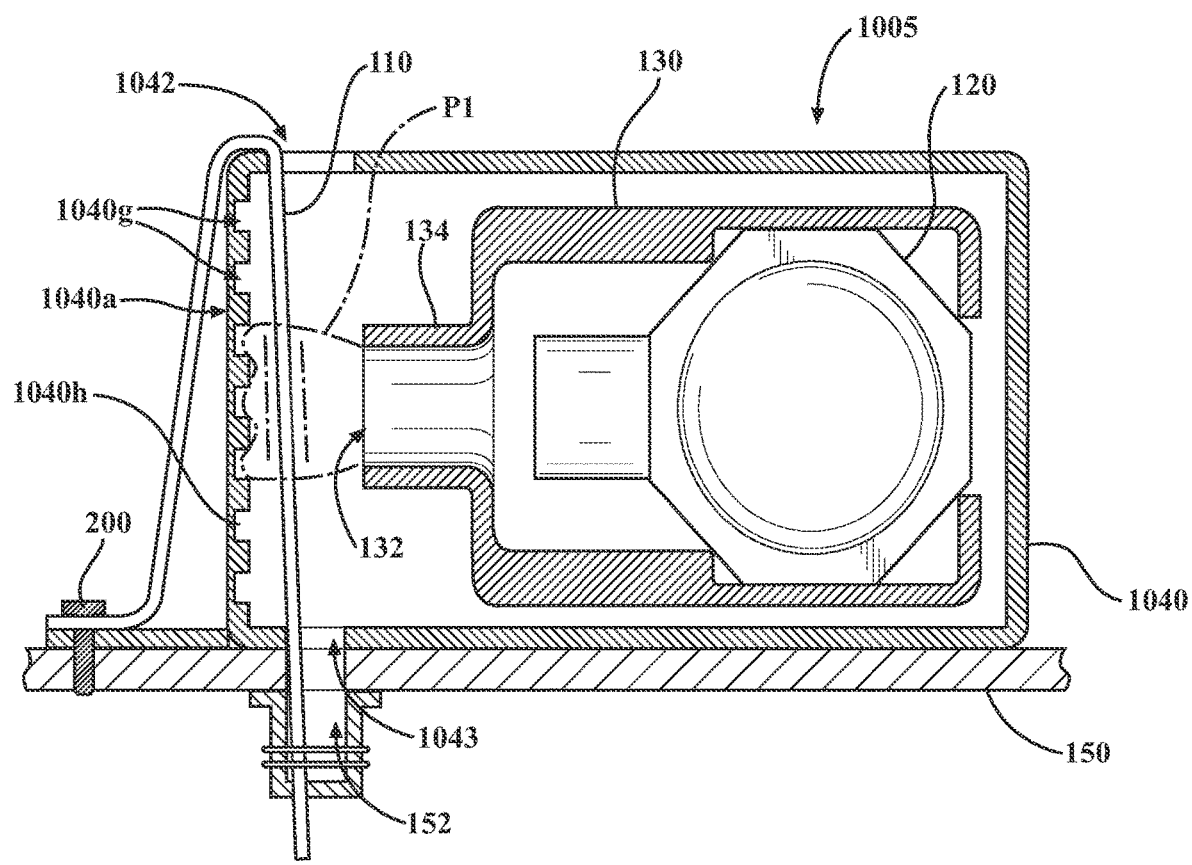
FIGS. 11A and 11B are views of an airbag tether separation system including a tether separator incorporating another embodiment of the tether separator housing.
Figure 11B:
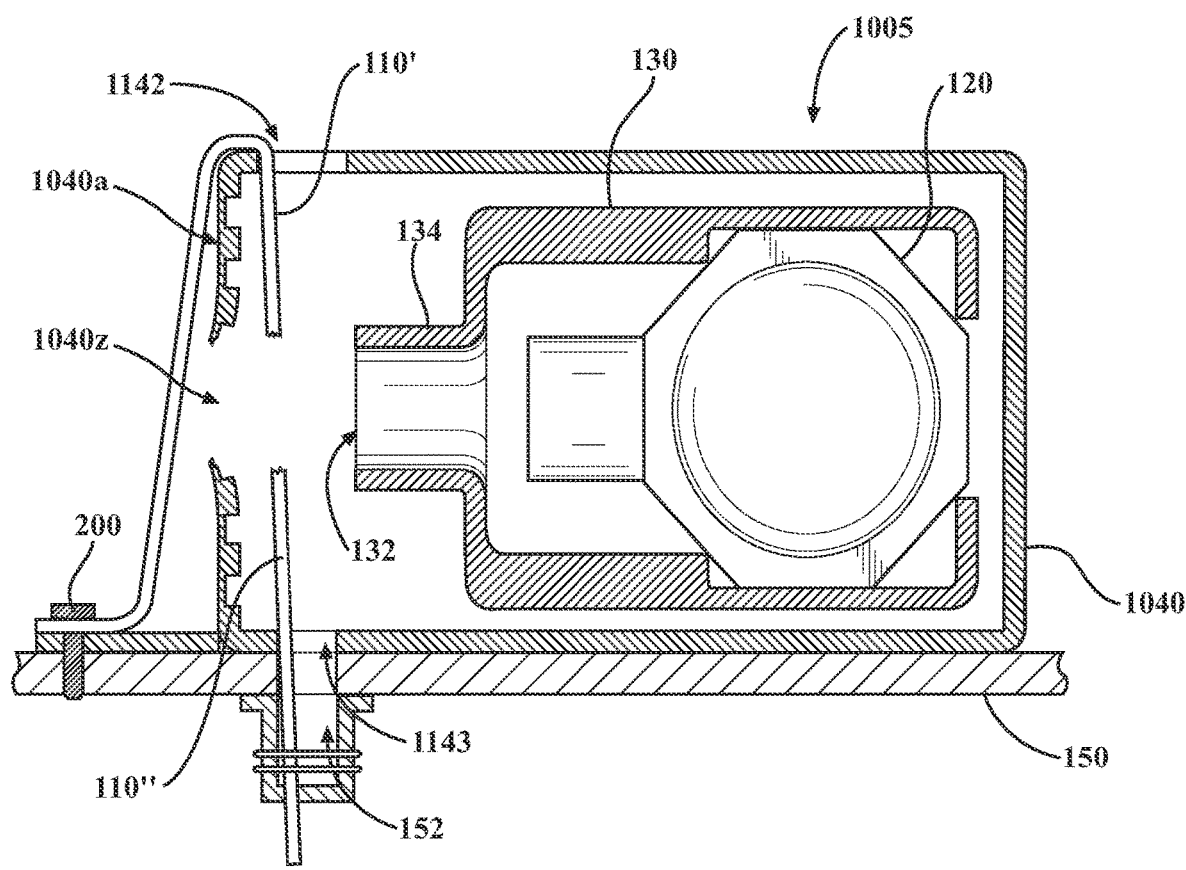

FIGS. 11A and 11B are schematic cross-sectional views showing an embodiment 1000 of the airbag tether separation system incorporating another embodiment 1005 of the tether separator including another embodiment 1040 of the tether separator housing. Unless otherwise indicated, the embodiment shown in FIGS. 11A and 11B may be structured the same as the embodiment shown in FIGS. 1-3. In the embodiment shown in FIGS. 11A and 11B, the at least one space provided in housing front wall 1040a for receiving shockwaves P1 emanating from the focus sleeve exit opening 132 is in the form of at least one groove 1040g formed in the wall 1040a. In particular arrangements, a plurality of grooves 1040*g* may be formed in the wall 1040*a* to receive and focus portions of the shockwaves P1 therein. In one or more arrangements, the front wall 1040*a* has a reduced cross-sectional area portion 1040*h* formed at a base of each of groove(s) 1040*g*. Each reduced cross-sectional area portion 1040*h* may be structured to rupture so as to form an associated through-opening in the wall 1040*a* responsive to passing of shockwaves P1 into the associated groove 1040*g*. In addition, referring to FIG. 11B, multiple reduced cross-sectional area portions 1040*h* may simultaneously rupture responsive to impingement thereon by shockwaves P1, causing a portion of the wall 1040*a* including one or more of the grooves 1040*g* to break away from the main portion of the wall, thereby effectively forming a relatively larger through-hole 1040*z* in the wall similar to through-hole 104*b* shown in FIGS. 1-3. Shockwaves P1 emanating from the focus sleeve exit opening 132 may then propagate though the resulting through-hole 1040*z*.

Figure 12:
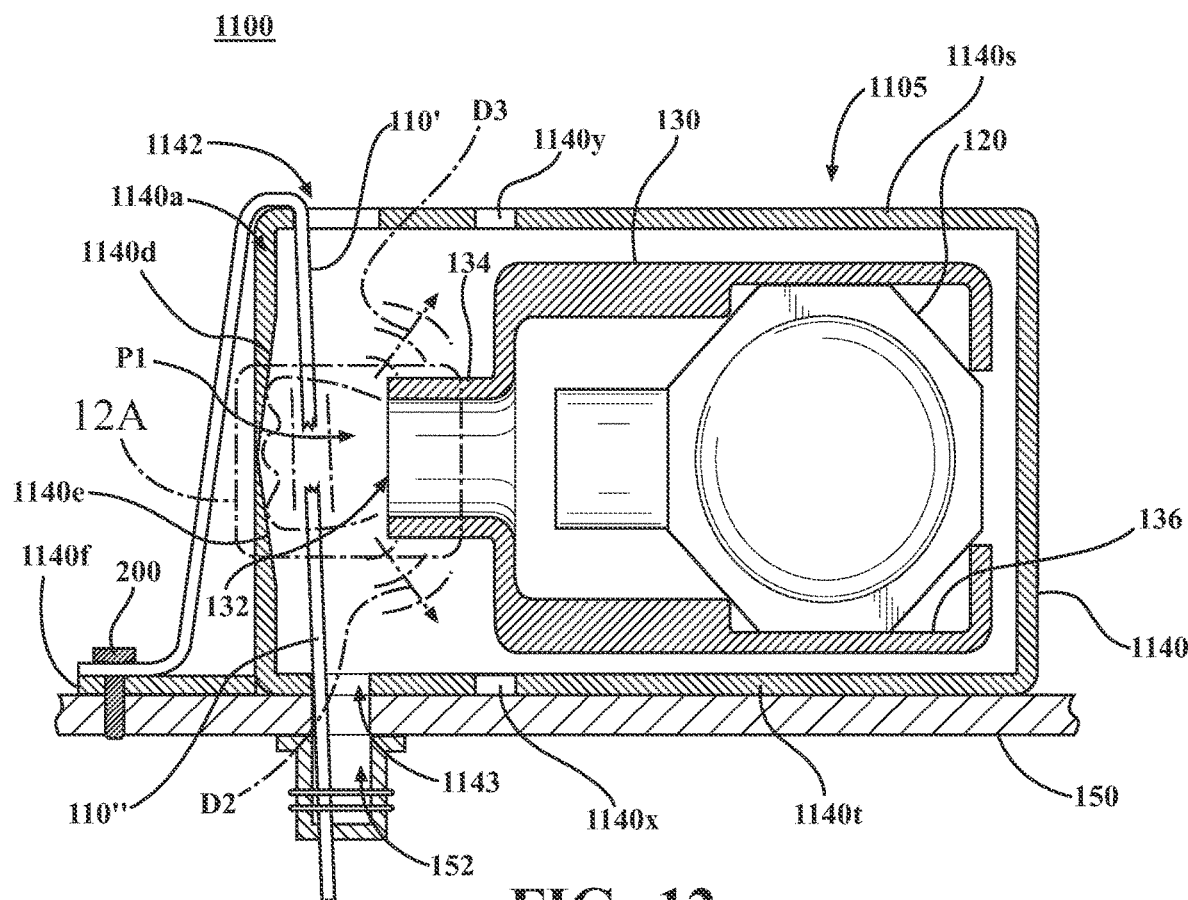
FIGS. 12 and 12A are views of an airbag tether separation system including a tether separator incorporating yet another embodiment of the tether separator housing.
Figure 12A:
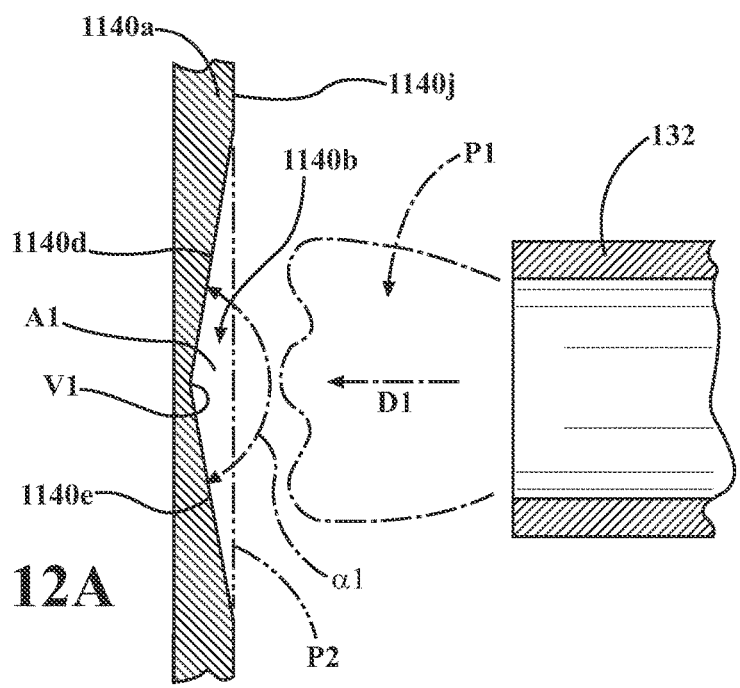

FIGS. 12 and 12A are schematic cross-sectional views showing an embodiment 1100 of the airbag tether separation system incorporating another embodiment 1105 of the tether separator including another embodiment 1140 of the tether separator housing. Unless otherwise indicated, the embodiment shown in FIGS. 12 and 12A may be structured the same as the embodiment shown in FIGS. 1-3. In the embodiment shown in FIGS. 12 and 12A, the at least one space provided in housing front wall 1140*a* for receiving shockwaves emanating from the focus sleeve exit opening 132 is defined by a pair of surfaces 1140*d* and 1140*e* intersecting so as to form an obtuse angle A1 therebetween. As seen in FIGS. 12 and 12A, the space 1140*b* may be defined by the surfaces 1140*d* and 1140*e* and an imaginary plane P2 connecting locations where the sloped surfaces 1140*d* and 1140*e* intersect an interior surface(s) 1140*j* of the wall 1040*a* facing inwardly toward the opening 132. In some arrangements, surface(s) 1140*j* may extend perpendicular to the direction D1 of propagation of the shockwaves P1. As seen from FIGS. 12 and 12A, in the embodiment shown, the surfaces 1140*d* and 1140*e* are outwardly sloping (i.e., angled or sloped in directions from the interior surface 1140*j* of the front wall and away from the focus sleeve exit opening 132) toward a vertex V1 where the surfaces 1140*d* and 1140*e* intersect. Thus, as seen in FIG. 12A, the surfaces 1140*d*, V1, 1140*e* may form a concave exterior angle α1 (i.e., an angle less than 180° formed along an exterior of the wall structure).

In the embodiment shown in FIGS. 12 and 12A, the space 1140*b* may be defined as a region residing between the two intersecting sloped surfaces 1140*d* and 1140*e*. In addition, each surface of the pair of surfaces 1140*d* and 1140*e* may be structured to deflect a portion of the shockwaves P1 entering the space 1140*b* in a direction toward an associated sidewall of the housing. In this manner, portions of the shockwaves P1 impinging on the wall 1140*a* are deflected by surfaces 1140*d* and 1140*e* in directions generally away from the tether separation region 112. For example, surface 1140*d* may deflect portions of shockwaves incident on the surface in a direction D2 toward sidewall 1140*t*. Similarly, surface 1140*e* may deflect portions of shockwaves P1 incident on the surface in a direction D3 toward sidewall 1140*s*.

In particular arrangements, one or more surfaces of the pair of surfaces 1140*d* and 1140*e* is structured to deflect a portion of the shockwaves entering the space 1040*b* in a direction toward an associated slot formed in a sidewall of the housing. This may permit a portion of the shockwaves P1 to propagate outside the housing 1140 through the slot. The slot(s) in the sidewalls toward which the reflected shockwaves P1 are redirected may be one or more of slots 1142 and 1143 through which the tether 110 extends, or the slot(s) may be other slot(s) formed to enable shockwaves to propagate outside the housing 1140. For example, slots 1140*y* and 1140*x* may be formed in sidewalls 1140*s* and 1140*t*, respectively. Surface 1140*d* may deflect portions of shockwaves incident on the surface in direction D2 toward slot 1140*x* formed in sidewall 1140*t*. Similarly, surface 1140*e* may deflect portions of shockwaves incident on the surface in direction D3 toward slot 1140*y* formed in sidewall 1140*s*. The sloping angles of the surfaces 1140*d* and 1140*e* may be adjusted with respect to the expected angles of incidence of the shockwaves P1 on the surfaces to reflect portions of the shockwaves toward specific portions of the sidewalls 1140*s* and 1140*t* where the respective slots 1140*y* and 1140*x* are located.

Figure 13:
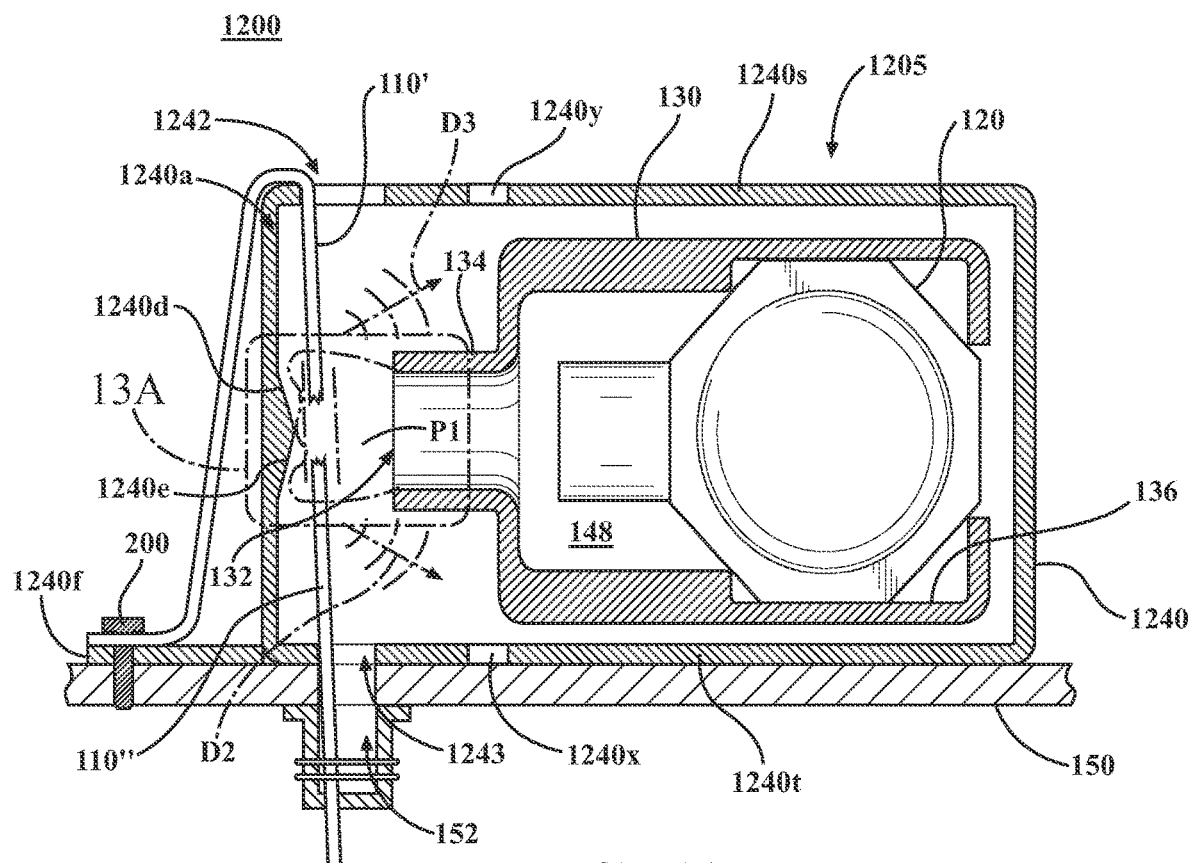
FIGS. 13 and 13A are views of an airbag tether separation system including a tether separator incorporating yet another embodiment of the tether separator housing.
Figure 13A:
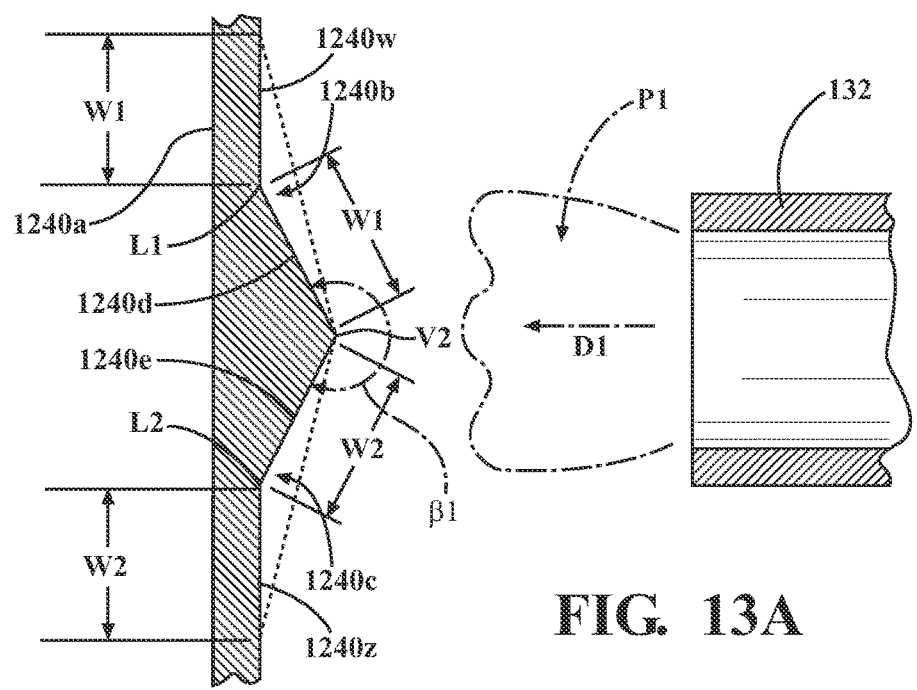

FIGS. 13 and 13A are schematic cross-sectional views showing an embodiment 1200 of the airbag tether separation system incorporating another embodiment 1205 of the tether separator including another embodiment 1240 of the tether separator housing. Unless otherwise indicated, the embodiment shown in FIGS. 13 and 13A may be structured the same as the embodiment shown in FIGS. 1-3.

In the embodiment shown in FIGS. 13 and 13A, the at least one space provided in housing front wall 1240*a* for receiving shockwaves emanating from the focus sleeve exit opening 132 is defined by at least one inwardly sloping surface (i.e., at least one surface that slopes in a direction from the wall 1240*a* toward the focus sleeve exit opening 132). In the embodiment shown in FIGS. 13 and 13A, two spaces 1240*b* and 1240*c* are formed using the sloped surfaces 1240*d* and 1240*e*. In the embodiment shown in FIGS. 13 and 13A, each space may be defined as a region residing between one of sloped surfaces 1240*d* and 1240*e* and an associated adjacent, intersecting wall surface. For example, space 1240*b* may be defined as a region between sloped surface 1240*d* and a portion of the adjacent, intersecting wall surface 1240*w* extending to a length from the line of intersection L1 equal to a width W1 of the sloped surface 1240*d*. Similarly, space 1240*c* may be defined as a region between sloped surface 1240*e* and a portion of the adjacent, intersecting wall surface 1240*z* extending to a length from the line of intersection L2 equal to a width W2 of the sloped surface 1240*c*. Thus, as seen in FIG. 13A, the surfaces 1240*d*, V2, 1240*e* may form a convex exterior angle β1 (i.e., an angle greater than 180° formed along an exterior of the wall structure).

In addition, as described previously with respect to the embodiment shown in FIGS. 12 and 12A, each surface of the pair of surfaces 1240*d* and 1240*e* may be structured to deflect a portion of the shockwaves P1 entering an associated one of spaces 1240*b* and 1240*c* in a direction toward an associated sidewall of the housing 1240. In this manner, portions of the shockwaves impinging on the wall 1240*a* are deflected by surfaces 1240*d* and 1240*e* in directions generally away from the tether separation region 112. For example, surface 1240*e* may deflect portions of shockwaves incident on the surface in a direction D2 toward sidewall 1240*t*. Similarly, surface 1240*d* may deflect portions of shockwaves incident on the surface in a direction D3 toward sidewall 1240*s*.

Portions of shockwaves P1 impinging substantially perpendicularly on portions of wall 1240*a* may be reflected at angles substantially perpendicular to the wall portions. However, due to the locations of the sloped surfaces 1240*d* and 1240*e* directly opposite the exit opening 132, portions of the shockwaves P1 reflected from these surfaces may not enter the separation region 112 positioned between the intersection V2 of the sloped surfaces 1240*d* and 1240*e* and the exit opening 132. Thus, any shockwave reflection from the surfaces 1240*d* and 1240*e* may be largely attenuated.

In particular arrangements, one or more surfaces of the pair of surfaces 1240*d* and 1240*e* is structured to deflect a portion of the shockwaves entering respective spaces 1240*b* and 1240*c* in direction(s) toward associated slot(s) formed in sidewall(s) of the housing 1240. This may permit portions of the shockwaves to propagate outside the housing 1240 through the slot(s). The slot(s) in the sidewalls toward which the shockwaves are redirected may be one or more of slots 1242 and 1243 through which the tether 110 extends, or the slot(s) may be other slot(s) formed to enable shockwaves to propagate outside the housing 1240. For example, slots 1240*x* and 1240*y* may be formed in sidewalls 1240*t* and 1240*s*, respectively. Surface 1240*d* may deflect portions of shockwaves P1 incident on the surface in direction D3 toward slot 1240*y* formed in sidewall 1240*s*. Similarly, surface 1240*e* may deflect portions of shockwaves P1 incident on the surface in direction D2 toward slot 1240*x* formed in sidewall 1240*t*. The sloping angles of the surfaces 1240*d* and 1240*e* may be adjusted with respect to expected angles of incidence of the shockwaves P1 on the surfaces to reflect portions of the shockwaves toward specific portions of the sidewalls 1240*s* and 1240*t* where the respective slots 1240*y* and 1240*x* are located.

Figure 14:
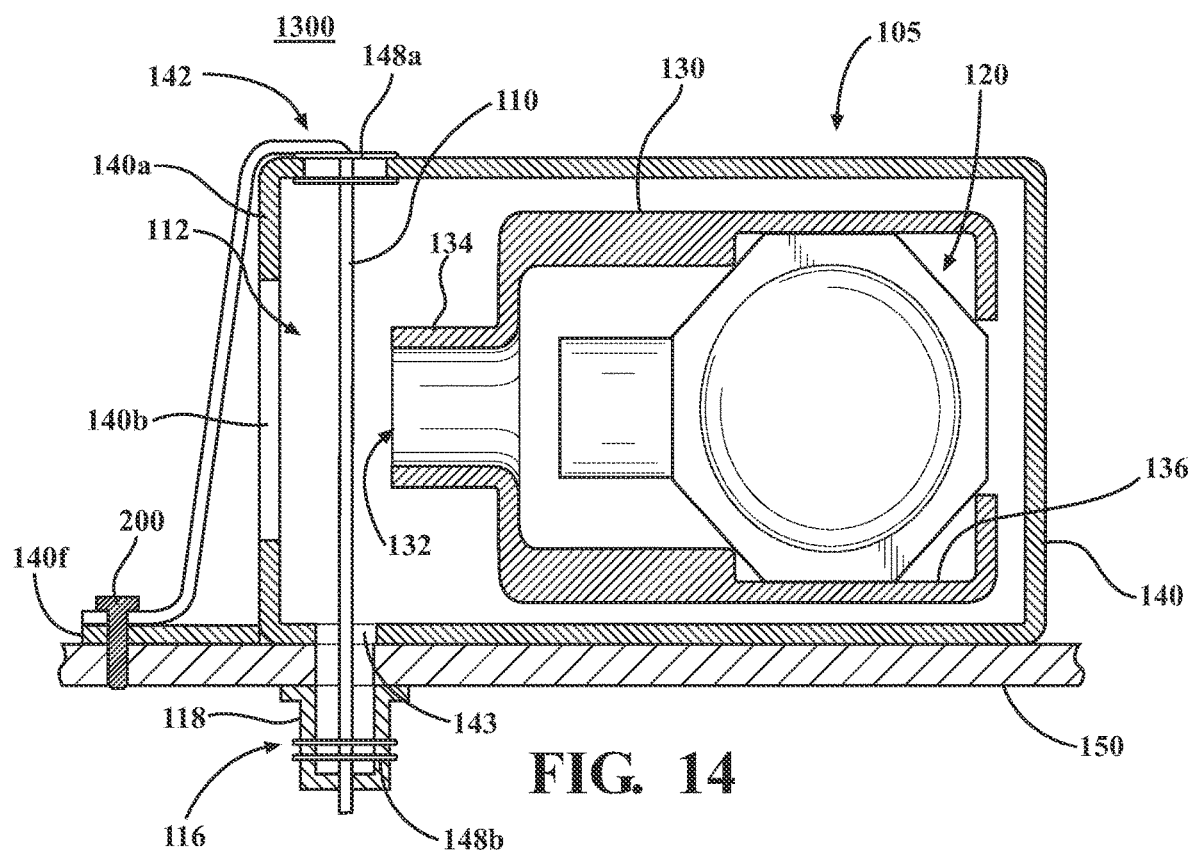
FIG. 14 is a view of another arrangement of the airbag tether separation system, showing the use one or more anchors to position a portion of the tether within the housing interior.

Referring to FIG. 14, a view of another arrangement 1300 of the airbag tether separation system is shown. Unless otherwise indicated, the embodiment shown in FIG. 14 may be structured the same as the embodiment shown in FIGS. 1-3. In this example, the airbag tether separation system 1300 can use at least one anchor 148 (in the embodiment shown, anchors 148*a* and 148*b*) to position a portion of the tether 110 extending between the explosive 120 and the front wall 140*a*. The anchor(s) 148 may constrain the movement of the tether 110 at least in a direction away from the explosive 120 and/or the exit opening 132 of the focus sleeve 130 (e.g., to the left in the orientation shown in FIG. 14). The anchors 148 can also constrain the movement of the tether 110 in a direction toward the explosive 120 and/or the exit opening 132 of the focus sleeve 130 (e.g., to the right in the orientation shown in FIG. 14). The anchor(s) 148 may be mounted to the housing 140 inside or adjacent housing slots 142 and 143. The embodiment shown uses a pair of anchors 148*a* and 148*b*, with anchor 148*a* mounted inside or adjacent slot 142 and anchor 148*b* mounted inside or adjacent slot 143.

The anchors 148 can be any type of gripping structure, now known or later developed. The anchors 148 can be made of any suitable material, such as rubber, plastic, composite, and/or metal. The anchors 148 can have any suitable size, shape, and/or configuration. Each anchor can engage the tether 110 so as to fix the position of the gripped portion of the tether with respect to the housing 140. The anchors 148 can be operatively connected to the tether separator housing 140.

In some arrangements, the anchors 148 can be configured and/or positioned such that movement of the tether 110 is restricted to being located within a sufficient distance from the exit opening 132 of the focus sleeve 130 and/or the explosive 120 such that the tether 110 will separate when the explosive 120 is activated.

Figure 15:
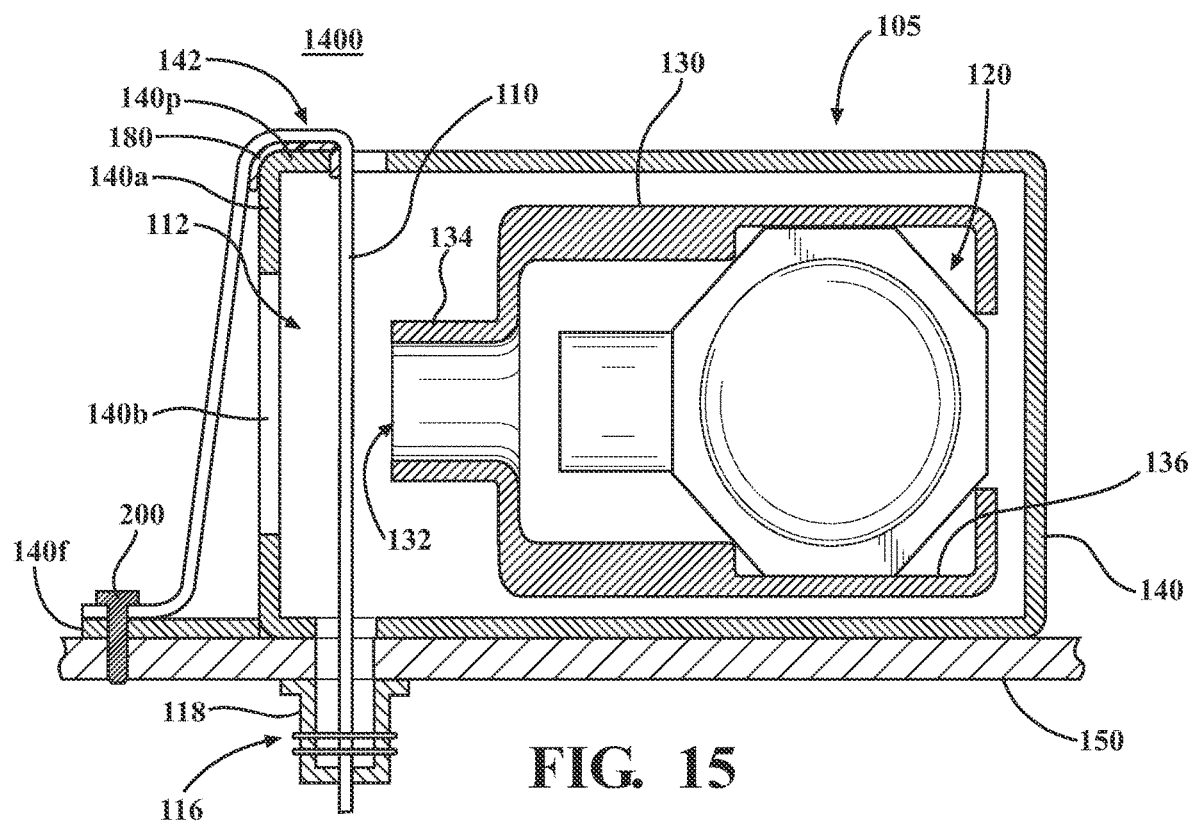
FIG. 15 is a view of another arrangement of the airbag tether separation system, showing the use of a cushion interposed between the tether and a portion of the tether separator housing over which the tether is wrapped.

FIG. 15 is a schematic cross-sectional view of a variation of the airbag tether separation system 1400 similar to the version shown in FIGS. 1-3. In this version, a cushion 180 is interposed between the tether 110 and the portion 140*p* of the housing 140 over which the tether is wrapped. The cushion 180 may be formed from a relatively resilient material (such as a compressible rubber compound) to aid in relieving stresses acting on the portion 140*p* of the housing 140 before and during breakage of the tether 110.

FIGS. 16 and 16A are views of an embodiment 1600 of the airbag tether separation system similar to the version shown in FIGS. 1-3, but incorporating a two-piece housing 1640 suitable for purposes described herein. FIG. 16 is a schematic perspective exploded view of the housing 1640. FIG. 16A is a schematic cross-sectional view similar to the view of FIG. 1, showing the housing 1640 in an assembled condition.

In one or more arrangements, the housing 1640 includes a first part 1640*m* and a second part 1640*n* structured to be attachable to the first part 1640*m* to define the housing interior 1640*h* therebetween. A parting line 1640*q* shows where the parts 1640*m* and 1640*n* may be joined when assembled. The first part 1640*m* may be structured to receive therein the explosive 120, the focus sleeve 130, and at least a portion of the tether 110 as previously described. The second part 1640*n* may be structured to receive therein at least a portion of the tether 110. The second part 1640*n* may also include a front wall 1640*a* defining an embodiment of the space 1640*b* structured to attenuate and/or redirect shockwaves emanating from the exit opening 132 as previously described. Recessed edge portions 1649*a* and 1651*a* may be included along upper edges of the first and second parts 1640*m* and 1640*n*, respectively, to define (in combination) an upper exit opening (e.g., slot 142) for the tether 110 from the housing interior 1640*h*. Also, recessed edge portions 1649*b* and 1651*b* may be included along lower edges of the first and second parts 1640*m* and 1640*n*, respectively, to provide a lower exit opening (e.g., slot 143) for the tether 110 from the housing interior 1640*h*.

During assembly, the tether 110 may be positioned between the first and second parts 1640*m* and 1640*n* as shown in FIG. 16. The first and second parts 1640*m* and 1640*n* may then be joined together along the parting line 1640*q* with the tether 110 extending therethrough. The first and second parts 1640*m* and 1640*n* may be securable to each other along the edges using latches, adhesives and/or any other suitable method. The two-piece housing 1640 may facilitate routing of the tether 110 through the housing, obviating the need to manually thread the tether through openings in a single-piece housing and through the housing interior.

It will be appreciated that arrangements described herein can provide numerous benefits, including one or more of the benefits mentioned herein. For example, arrangements described herein can effectively and reliably release a tether. Arrangements described herein can release a tether with no moving parts. Arrangements described herein can release a tether while keeping the number of parts to do so to a minimum. Arrangements described herein can release a tether without any breakaway pieces. Arrangements described herein can use commonly available ignitors. Arrangements described herein can facilitate a smaller packaging design for the tether release. Arrangements described herein can enable the ignitor to be activated at any time, regardless of cushion internal pressure. Arrangements described herein can be used in connection with various airbags, including driver and passenger airbags. Arrangements described herein may allow for potentially less expensive tether separator designs to be realized.

The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An airbag tether separation system, comprising an airbag tether separator including an explosive and a housing having a front wall with a plurality of grooves formed therein, the tether separator being structured so that, when the explosive is activated, the explosive produces shockwaves causing separation of a portion of a tether extending between the explosive and the front wall, at least a portion of the shockwaves also passing into and rupturing at least one groove of the plurality of grooves.

2. The airbag tether separation system of claim 1, wherein at least one groove of the plurality of grooves has a reduced cross-sectional area portion formed at a base of the at least one groove and structured to rupture so as to form a through-opening in the front wall responsive to passing of shockwaves into the at least one groove.

3. An airbag tether separation system, comprising an airbag tether separator including an explosive and a housing having a front wall with at least one space formed in the front wall, the tether separator being structured so as to provide an unobstructed path leading from the explosive to the tether prior to activation of the explosive, the tether separator being structured so that, when the explosive is activated, the explosive produces shockwaves causing separation of a portion of a tether extending between the explosive and the front wall, at least a portion of the shockwaves also passing into the at least one space, wherein the at least one space comprises a through-hole formed in the front wall.

4. The airbag tether separation system of claim 3, further comprising:
a slot formed in the housing; and
at least one anchor mounted to the housing inside or adjacent the slot and structured to position a portion of the tether extending from between the explosive and the front wall through the slot.

5. The airbag tether separation system of claim 3, wherein the housing also includes a slot, the system further comprising a tether extending through an interior of the housing between the explosive and the front wall and out of the housing interior through the slot to an exterior of the housing, the tether being secured to the housing along the housing exterior.

6. The airbag tether separation system of claim 5, wherein the tether wraps over a portion of the housing between the slot and a portion of the housing exterior to which the tether is secured.

7. The airbag tether separation system of claim 6, further comprising a cushion in contact with the tether between the tether and the portion of the housing over which the tether is wrapped.

8. The airbag tether separation system of claim 5, wherein the housing further comprises a projection formed along the housing exterior, and wherein the tether is secured to the housing exterior along the projection.

9. The airbag tether separation system of claim 5, wherein the housing includes a first portion and a second portion formed separately from the first portion and structured to be attachable to the first portion to define the slot therebetween.

10. An airbag tether separation system, comprising:
an airbag tether separator including an explosive and a housing, the housing having a front wall and a slot; and
a tether extending through an interior of the housing between the explosive and the front wall and out of the housing interior through the slot to a securement location along an exterior of the housing,
the tether wrapping over a portion of the housing between the slot and the securement location, the tether separation system being structured so that, when the explosive is activated, the explosive produces shockwaves, and wherein the tether separator further comprises a focus sleeve configured to direct the shockwaves and the heat energy produced by the explosive toward the tether to cause separation of the tether in the housing interior.

11. The airbag tether separation system of claim 10, wherein the front wall includes a space formed therein and defined by a pair of surfaces intersecting so as to form an obtuse and concave angle therebetween.

12. The airbag tether separation system of claim 11, wherein a surface of the pair of surfaces is structured to deflect a portion of the shockwaves entering the at least one space in a direction toward a sidewall of the housing.

13. The airbag tether separation system of claim 12, wherein the surface of the pair of surfaces is structured to deflect a portion of the shockwaves entering the at least one space in a direction toward a slot formed in the sidewall of the housing.

14. The airbag tether separation system of claim 11, wherein the at least one space is formed by a pair of intersecting outwardly sloping surfaces.

15. The airbag tether separation system of claim 11, wherein the at least one space is formed by at least one inwardly sloping surface.

16. The airbag tether separation system of claim 10, wherein the focus sleeve is configured to hold the explosive in place.

17. The airbag tether separation system of claim 10, further comprising a space formed by intersecting portions of the front wall.

* * * * *